Nov. 24, 1970  H. E. GRANT  3,541,627
AUTOMOBILE WHEEL WASHER
Filed July 23, 1968  2 Sheets-Sheet 1
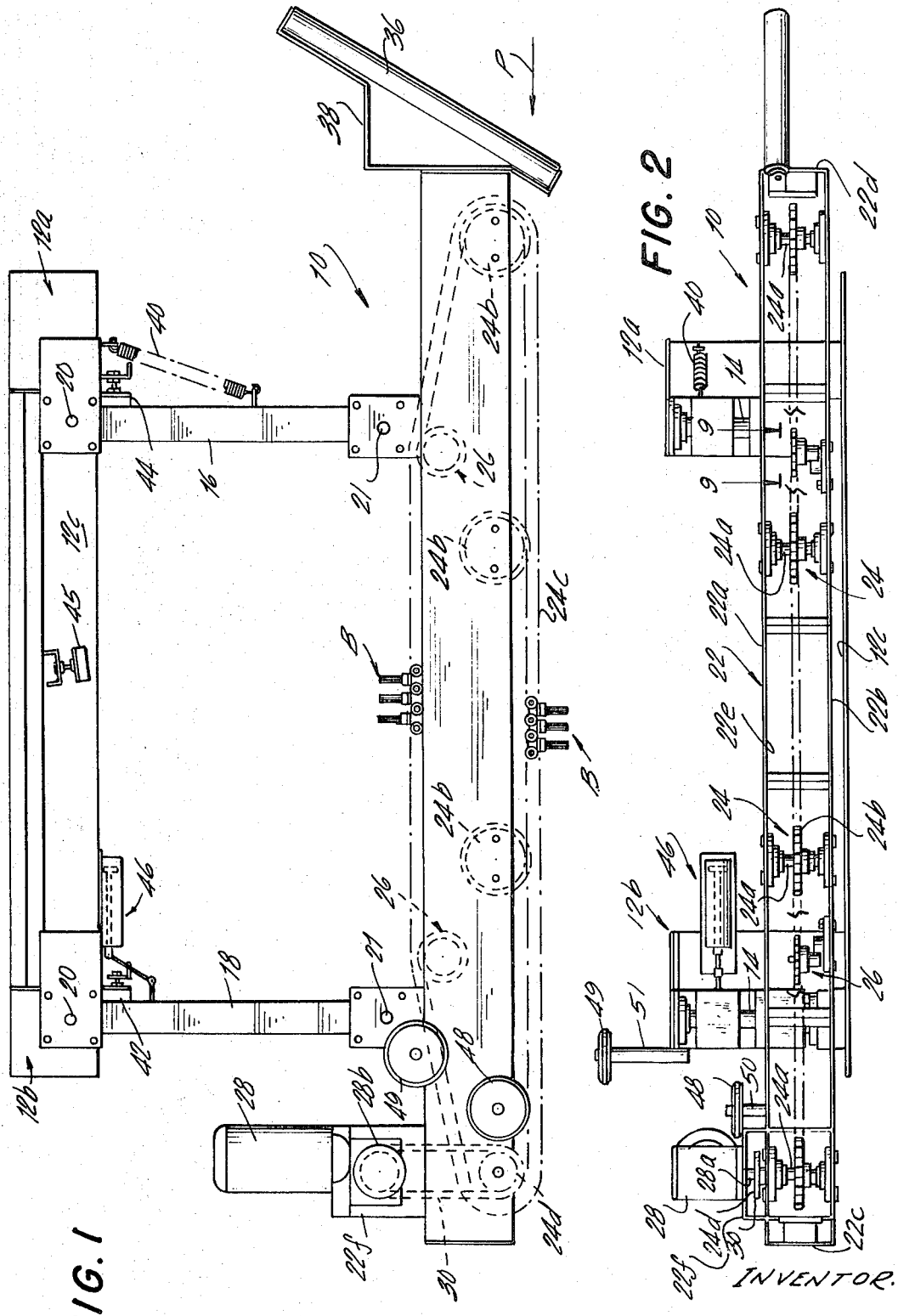
INVENTOR.
HOWARD E. GRANT
ATTORNEYS

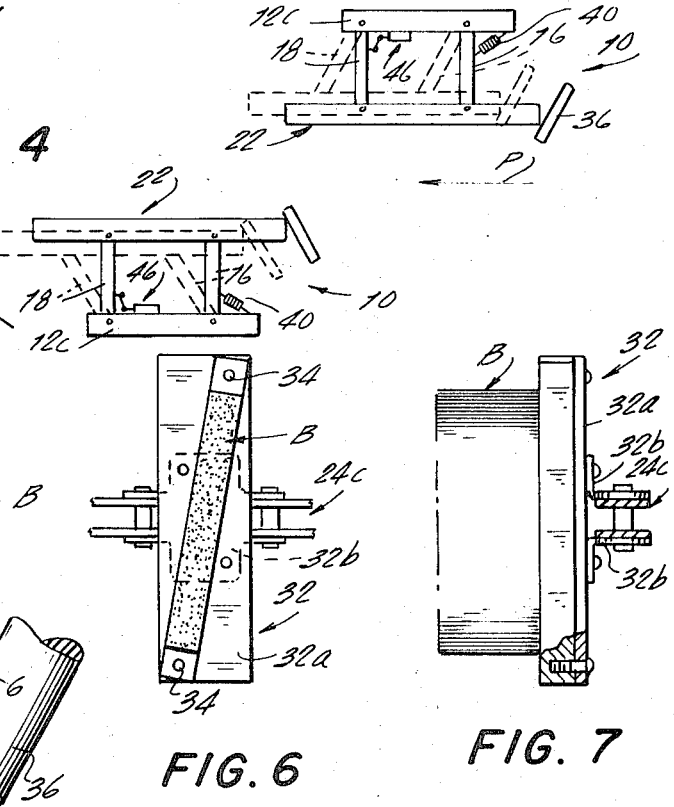
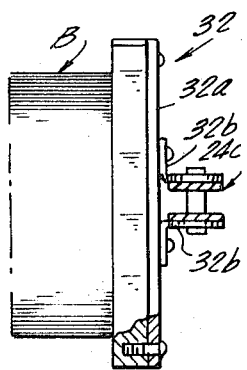
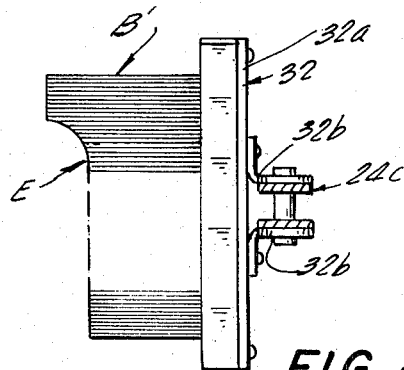
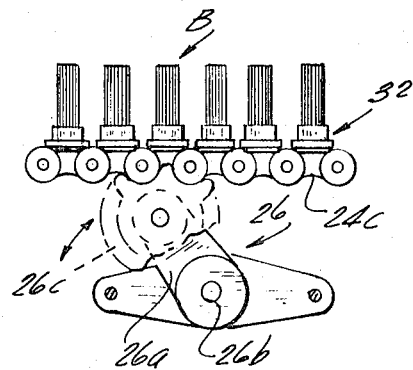
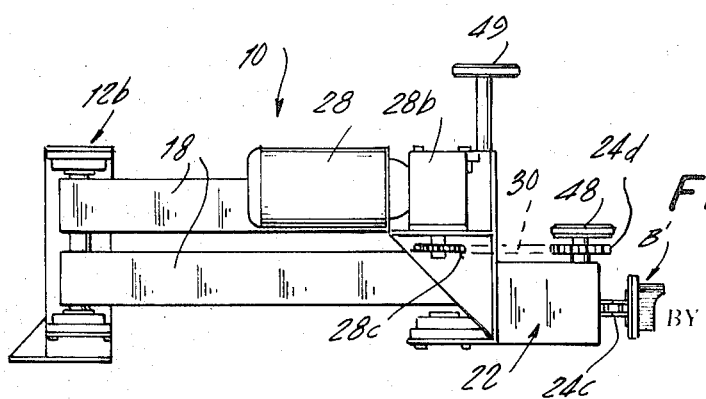
FIG. 4
FIG. 5  FIG. 6  FIG. 7
FIG. 8  FIG. 9
FIG. 3
INVENTOR.
HOWARD E. GRANT
ATTORNEYS

# United States Patent Office 3,541,627
Patented Nov. 24, 1970

3,541,627
AUTOMOBILE WHEEL WASHER
Howard E. Grant, c/o Trans-World Car Wash Systems, Inc., 65 Marine St., Farmingdale, N.Y. 11735
Filed July 23, 1968, Ser. No. 746,803
Int. Cl. B60s 3/04
U.S. Cl. 15—21                                  9 Claims

ABSTRACT OF THE DISCLOSURE

For use in a car or automobile washing unit in the operation of which an automobile is moved along a prescribed path in association with various apparatus for cleaning different parts of the automobile, a wheel washer employing brushes mounted on endless conveyors strategically located on opposite sides of the prescribed path and having cleaning contact with the automobile, and wherein movement of the automobile and brushes in opposite directions contribute to the cleaning action.

---

The present invention relates generally to automobile washing units in the operation of which use is made of various apparatus to clean different parts of the automobile, and more particularly to an improved automobile wheel washer.

In current use are numerous embodiments of automobile washing units which have in common a mode of operation wherein the automobile is urged along a path of movement in association with different apparatus strategically located and designed to clean a different part of the automobile. Consistent with the popularity and proven commercial acceptance of these units there is a continuing effort by equipment manufacturers to provide improved cleaning apparatus, particularly the cleaning apparatus for the automobile wheels which present the most stringent cleaning demands. Known wheel cleaning apparatus include rotary and reciprocating brushes which achieve the desired results but are not entirely satisfactory. In many instances the comparatively short interval of contact of the brushes with the automobile wheels prevents satisfactory cleaning and, if the cleaning action is made more vigorous as by increasing the contact pressure of the brushes, excessive brush wear results requiring frequent brush replacement and unproductive down-time of the cleaning apparatus.

Broadly, it is an object of the present invention to provide an improved automobile wheel washer overcoming the foregoing and other shortcomings of the prior art. Specifically, it is an object to provide an automobile wheel washer characterized by a comparatively long interval of cleaning contact between the brushes and wheels, and in which numerous brushes are used such that the wear of each individual brush during a cleaning interval is practically nominal, and in which opposing movements of the brushes and automobile provide an inherently vigorous and efficient cleaning action.

An automobile wheel washer demonstrating objects and advantages of the present invention includes an endless conveyor operatively arranged with a run adjacent the automobile path of movement and in facing relation thereto and having plural brushes mounted to extend laterally from the conveyor so that cleaning contact is made by the brushes along the noted conveyor run for not only its entire length but also for the interval that the automobile takes to pass the conveyor. Further, the conveyors are operated so that brush movement is in opposition to the direction of movement of the automobile, thereby contributing to the scrubbing action of the brushes.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein:

FIG. 1 is a plan view of a wheel washer of an automobile washing unit demonstrating objects and advantages of the present invention;

FIG. 2 is a front elevational view of the wheel washer, the brushes thereof being omitted for clarity sake, illustrating further structural details;

FIG. 3 is an end elevational view of the wheel washer illustrating still further structural details;

FIG. 4 is a diagrammatic plan view of a typical arrangement of two cooperating wheel washers in which positions of movement thereof are illustrated in full line and phantom line perspective;

FIG. 5 is a partial plan view, on an enlarged scale, of the end of the wheel washer first encountered by the automobile, portions thereof being broken away to better illustrate internal structural features thereof;

FIG. 6 is an isolated elevational view, on an enlarged scale, taken in the direction of line 6—6 of FIG. 5, illustrating structural features of a cleaning brush;

FIGS. 7 and 8 are isolated end elevational views of two different embodiments of brushes; and FIG. 9 is a plan view, on an enlarged scale, taken in section on line 9—9 of FIG. 2, illustrating structural features of the conveyor chain tensioning means.

Reference is now made to the drawings, and in particular to FIGS. 1 and 4, wherein there is shown a wheel washer, generally designated 10, intended specifically for an automobile car washing unit. The latter noted FIG. 4 is a diagrammatic representation of two cooperating wheel washers 10 located on opposite sides of and bounding the path of movement P which is taken by an automobile being processed through the car washing unit. Thus, as will be described in greater detail subsequently herein, an automobile (not shown) during typical use of the car washing unit is operatively arranged to partake of movement along the path P and is thereby brought into cleaning contact with the wheel washers 10 strategically located along the path of movement P, as illustrated, or if space permits, are located directly opposite each other on opposite sides of the path of movement P.

Inasmuch as each of the cooperating wheel washers 10 are substantially identically constructed for brevity sake only one of these washers will be described in detail. As may be best understood from the plan view of FIG. 1 in conjunction with the elevational view of FIG. 2, each wheel washer 10 includes a remote upstanding pair of supports 12a, 12b, from which the movable portion of the washer extends laterally in a clearance position from a support base 12c (as well as from the riding surface for the automobile), this laterally extending position being effective to advantageously project the free end of the wheel washer 10, and thus the cleaning elements mounted thereon, into the path of movement P for cleaning contact with the automobile. Specifically, the upstanding supports 12a, 12b, in turn each appropriately support a pair of vertically oriented shafts 14 on which a pair of laterally extending support members 16 and 18 are respectively pivotally mounted, as at 20. At their respective opposite ends 21, the support members 16 and 18 are similarly pivotally mounted to additional shafts 14 which are in turn connected, as by welding or the like, to a generally rectangular support frame 22. As best shown in FIG. 2, frame 22 is formed by two elongated horizontally oriented upper and lower walls 22a, 22b in facing relation and by two opposite end walls 22c, 22d. Support frame 22 thus defines an operating area or compartment 22e for an endless chain conveyor, generally designated 24, now to be described in detail and the significance of which will be soon apparent.

The chain conveyor 24 is generally of conventional construction being entrained about sprockets 24b journalled for rotation on spaced, vertically oriented shafts 24a connected between the walls 22a, 22b. As best illustrated in FIG. 9, the chain conveyor 24 includes a usual tensioning device 26 which is effective in maintaining the chain 24c reasonably taut in its entrained condition about the sprockets 24b. In the illustrated embodiment, the device 26 includes an arm 26a, pivotally adjustable at one end about the pivot 26b and, at its other end, rotatably mounting a sprocket 26c in meshing engagement with the chain 24c.

As may be generally understood from a consideration of FIGS. 1, 2, a motor 28 supported on a lateral extension 22f of the support frame 22 is effective to drive the chain conveyor 24 in movement. That is, motor 28 includes the usual drive shaft 28a connected via a gear train 28b to a driving gear 28c which cooperates with a driven gear 24d mounted on an upper extended end of the sprocket shaft 24a located at the left end of the chain conveyor 24 (as viewed in FIG. 1) to support a small loop of endless chain 30 and which chain, in an obvious manner, completes the driving connection between the motor 28 and the chain conveyor 24.

As best understood from a consideration of FIG. 6 in conjunction with the other figures mounted at closely spaced intervals along the endless chain 24c are brush supports or holders 32, including a generally vertically oriented brush-holding surface 32a in facing or confronting relation to the path P. Each brush holder rear surface has rearwardly extending brackets 32b which are appropriately connected to the endless chain 24c, as for example by accommodating the upper and lower extending ends of the pins which connect the links of the chain, these extending ends then being swaged or otherwise appropriately adapted to maintain the connection between the brush holders and the chain. Appropriately mounted so as to extend laterally from each front surface 32a, as by bolts 34 or the like, and thus occupying a position projected into the automobile path of movement P are a continuous array or arrangement of brushes B, each of suitable construction and also made of suitable materials of constructions to result in efficient cleaning of the automobile with which it comes in contact. Best results have been achieved with individual brushes B having a combination of both wire and plastic bristles and each mounted at the slight inclination illustrated in FIG. 6. Additionally, each brush B may be rectangularly shaped, as illustrated in FIG. 7 or, as demonstrated by the brush embodiment B' of FIG. 8 have its innermost edge E, which comes in contact with the automobile, of a shape conforming to the shape or profile of the wheel being washed.

Completing the construction of each wheel washer 10 is an elastomeric or similarly constructed bumper 36 which, as best shown in FIGS. 1, 2, is mounted by a bracket 38 in an inclined position on the leading end of the support frame 22. The normal position of the bumper 36 is one in which it is actually projected into the path of movement and thus makes actual physical contact with the fender of the car being washed. This normal position is provided under the urgency of a heavy-duty helical spring 40 connected between the upstanding support 12a and the support member 16 and causing counter-clockwise rotation of the members 16, 18 about the pivots 20 until abutment against the stops 42, 44 located on the upstanding supports 12a, 12b. Stop 45 on the stationary support 12c limits opening or clockwise rotation of the members 16, 18.

Spring 40 not only holds the array of brushes B, or at least the conveyor run or length portion thereof which is adjacent the path of movement P, in cleaning contact with the sides of the vehicle, but in resiliently yielding to the impact of the automobile against the bumpers 36 it serves to cushion and thereby prevent this impact from causing damage to the wheel washer 10. Naturally, after the automobile has passed the wheel washer 10, it is returned under the urgency of the spring 40 to its normal position as illustrated in FIG. 1, the return movement thereof being achieved at a controlled slow rate of speed by a conventional hydraulic cylinder 46.

As a safety precaution to prevent inadvertent contact of the innermost edges of the support frame 22 with the smaller sizes of automobiles being washed and, thus, causing damage to the automobile, there is provided a rubber-edged idler wheel 48 journaled for rotation on an upstanding shaft 50 and thereby effective to maintain the support frame 22 in a clearance position with respect to the automobile. The rubber-edged idler wheel 49 journaled for rotation on the upstanding shaft 51 and mounted at a higher elevation on the frame 22, serves a similar function for the larger sizes of automobiles.

In typical operation of the car washing unit, it is contemplated that the chain conveyor 24 will be driven in movement so that the length portion thereof which is adjacent the path of movement P will move in a direction which opposes the movement of the automobile along the path of movement P. This opposing movement has been found to contribute to a greater cleaning action by the brushes in cleaning contact against the sides of the automobile. Additionally, the pivotally mounted support members 16, 18 function as a parallelogram and thus during their pivotal traverse about the two pivots 20, 21 are effective in maintaining each support frame 22, and thus the conveyor 24 thereon, in substantial alignment with the automobile path of movement P. This in turn maintains the brushes B in cleaning contact with the side of the automobile for the full duration of movement of the automobile past the wheel washer 10.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. In an automobile washing unit of the type having means for moving an automobile along a path of movement in association with cleaning apparatus, an automobile wheel washer comprising a pair of spaced apart supports located on opposite sides of and bounding said automobile path of movement, each said support including an endless conveyor operatively arranged for movement of a length portion thereof in confronting relation to said automobile path of movement and level with at least a portion of said automobile wheels, each said support being mounted in a laterally extending clearance position and movable to a predetermined extent in unison with said automobile along said automobile path of movement to thereby cushion the impact of said automobile against said support, and plural brush elements carried by each said endless conveyor extending laterally therefrom into said automobile path of movement into cleaning contact with said automobile wheels during movement of said automobile between said endless conveyors.

2. An automobile wheel washer as defined in claim 1 wherein each said support includes at least two laterally extending spaced apart support members operatively arranged in parallel relation and respectively pivotally mounted at their opposite ends so as to maintain said endless conveyors in alignment with said automobile path of movement during pivotal traverses of each said support.

3. An automobile wheel washer as defined in claim 1 wherein each said conveyor is operated such that movement of the portion thereof adjacent said automobile path of movement is in opposition to the direction of movement of said automobile so as to contribute to the cleaning action of said brushes in contact with said automobile.

4. In an automobile washing unit of the type having means for moving an automobile along a path of movement in association with cleaning apparatus, an automobile wheel washer comprising a pair of spaced apart supports located on opposite sides of and bounding said automobile path of movement, an endless conveyor operatively arranged on each said support such that a length portion thereof adjacent said automobile path of movement is substantially in alignment therewith and level with at least a portion of said automobile wheels, means for powering each said conveyor through movement such that said adjacent length portion thereof moves in opposition to said direction of movement of said automobile, each said support including at least two laterally extending spaced apart support members operatively arranged in parallel relation and respectively pivotally mounted at their opposite ends so as to partake of pivotal traverses in unison with said automobile along said path of movement while maintaining said endless conveyors in substantial alignment with said automobile path of movement, and a continuous array of brushes supported along the length of each said endless conveyor extending laterally therefrom into cleaning contact with said automobile wheels during movement of said automobile between said endless conveyors.

5. An automobile wheel washer as defined in claim 4 including spring means operatively connected to at least one of said support members of each said support effective to yieldingly permit pivotal movement of said support so as to cushion the impact of said automobile against said support.

6. In an automobile washing unit of the type having means for moving an automobile along a path of movement in association with cleaning apparatus, an automobile wheel washer comprising a stationary support, a pair of parallel support members pivotally mounted in a laterally extending clearance position from said stationary support into said automobile path of movement, a support frame defining an internal compartment pivotally mounted to said extending ends of said support members, and an endless conveyor including laterally extending brushes thereon operatively arranged within said internal compartment with said brushes in confronting relation to said automobile path of movement and effective to make cleaning contact with said automobile wheels during movement of said automobile past said endless conveyor.

7. An automobile wheel washer as defined in claim 6 including spring means connected between said stationary support and at least one said support member effective to cushion the initial impact of said automobile against said wheel washer and thereafter to hold said brushes in contact with said automobile during a cleaning interval.

8. An automobile wheel washer as defined in claim 7 wherein said conveyor is operated such that movement of the portion thereof adjacent said automobile path of movement is in opposition to the direction of movement of said automobile so as to contribute to the cleaning action of said brushes in contact with said automobile.

9. In an automobile washing unit of the type having means for moving an automobile along a path of movement in association with cleaning apparatus, an automobile wheel washer comprising a pair of spaced apart supports located on opposite sides of and bounding said automobile path of movement, each said support including an endless conveyor operatively arranged for movement of a length portion thereof in confronting relation to said automobile path of movement and level with at least a portion of said automobile wheels and plural brush holding elements fixedly secured to and carried by each said endless conveyor, plural brush elements fixedly secured to said brush holding elements and movable concomitantly therewith, and said brush elements extending laterally from said endless conveyor into said automobile path of movement into cleaning contact with said automobile wheels during movement of said automobile between said endless conveyors.

References Cited

UNITED STATES PATENTS 2,910,202   10/1959   Clarke et al. _____ 15—21.0 X
3,312,991   4/1967    Matson _____ 15—21.0

EDWARD L. ROBERTS, Primary Examiner